United States Patent [19]

Zani

[11] 4,146,333

[45] Mar. 27, 1979

[54] KITCHEN APPARATUS FOR PRODUCING FARINACEOUS PRODUCTS

[75] Inventor: Gianmauro Zani, Domodossola (Novara), Italy

[73] Assignee: S.p.A. R. Bialetti & C., Crusinallo (Novara), Italy

[21] Appl. No.: 886,357

[22] Filed: Mar. 14, 1978

[30] Foreign Application Priority Data

Mar. 14, 1977 [IT] Italy .............................. 20870/77[U]
Mar. 14, 1977 [IT] Italy .............................. 21185 A/77

[51] Int. Cl.² ................................................ B01F 7/02
[52] U.S. Cl. ...................................... 366/99; 366/279
[58] Field of Search ..................... 366/69, 96, 97, 98, 366/99, 100, 193, 194, 196, 197, 204, 206, 241, 242, 244, 245, 249, 251, 261, 272, 279, 341, 282, 347, 186, 279, 283

[56] References Cited

U.S. PATENT DOCUMENTS

| | | | |
|---|---|---|---|
| 3,169,753 | 2/1965 | Wegh .................................. | 366/279 |
| 3,450,179 | 6/1979 | Golding .............................. | 366/279 |
| 3,722,834 | 3/1973 | Bakewell ............................ | 366/99 |
| 3,746,317 | 7/1923 | Schroeder .......................... | 366/99 |

Primary Examiner—Edward J. McCarthy
Attorney, Agent, or Firm—Karl F. Ross

[57] ABSTRACT

A household appliance, to be used in the production of spaghetti, noodles and other farinaceous products, has a housing which contains a generally semicylindrical mixing vessel axially traversed by a horizontal shaft fitted with a set of axially spaced and angularly offset radially extending rods for beating a mass of dough. The rods, inserted into bores of the shaft, can be extracted to facilitate an axial withdrawal of the shaft from the housing whereupon the vessel can also be removed. The dough may be flattened and/or sliced by ancillary attachments powered by the shaft drive. One such attachment, designed to produce maccaroni, comprises an extruder screw at the bottom of the housing into which the dough can be discharged through a normally obstructed bottom slot in the mixing vessel.

10 Claims, 9 Drawing Figures

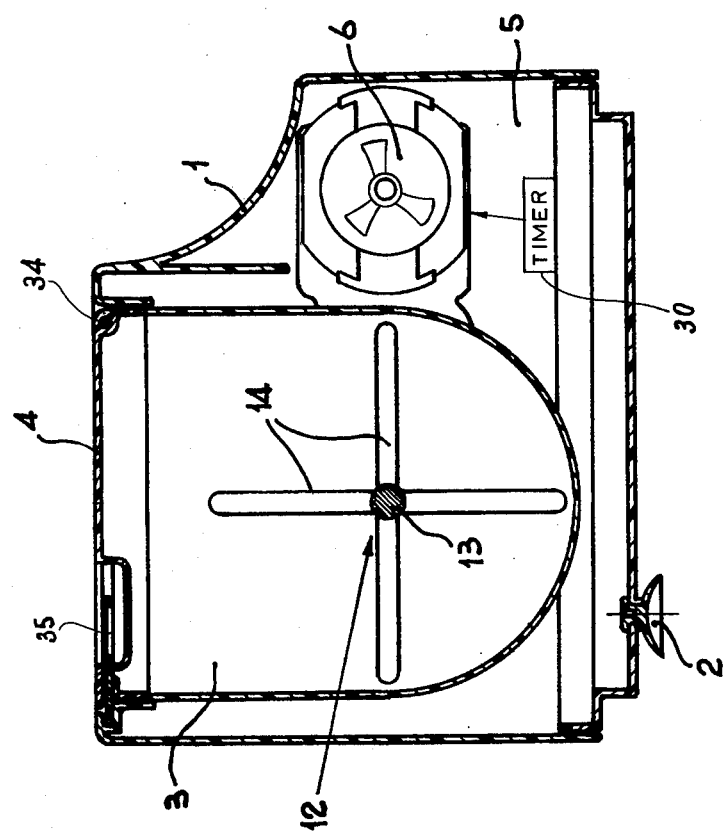

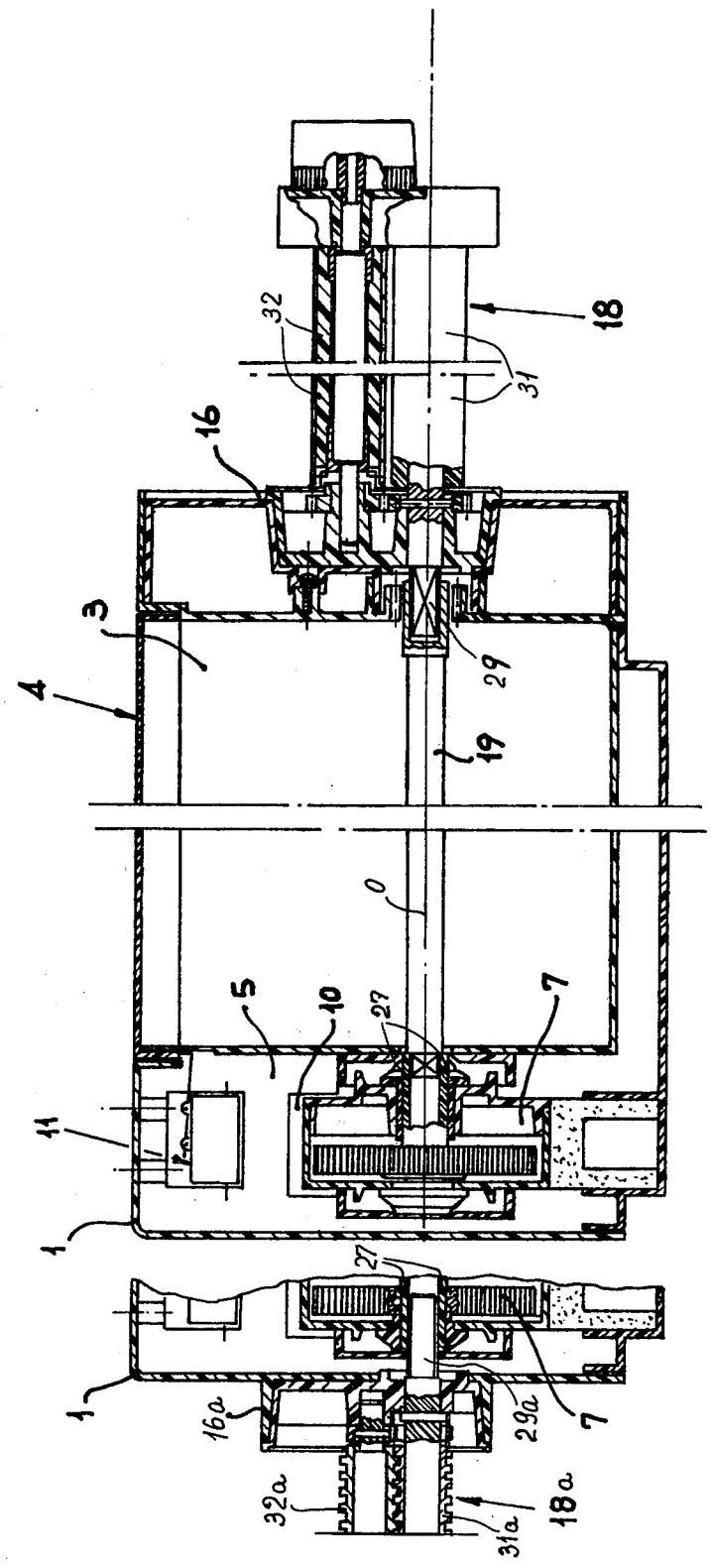

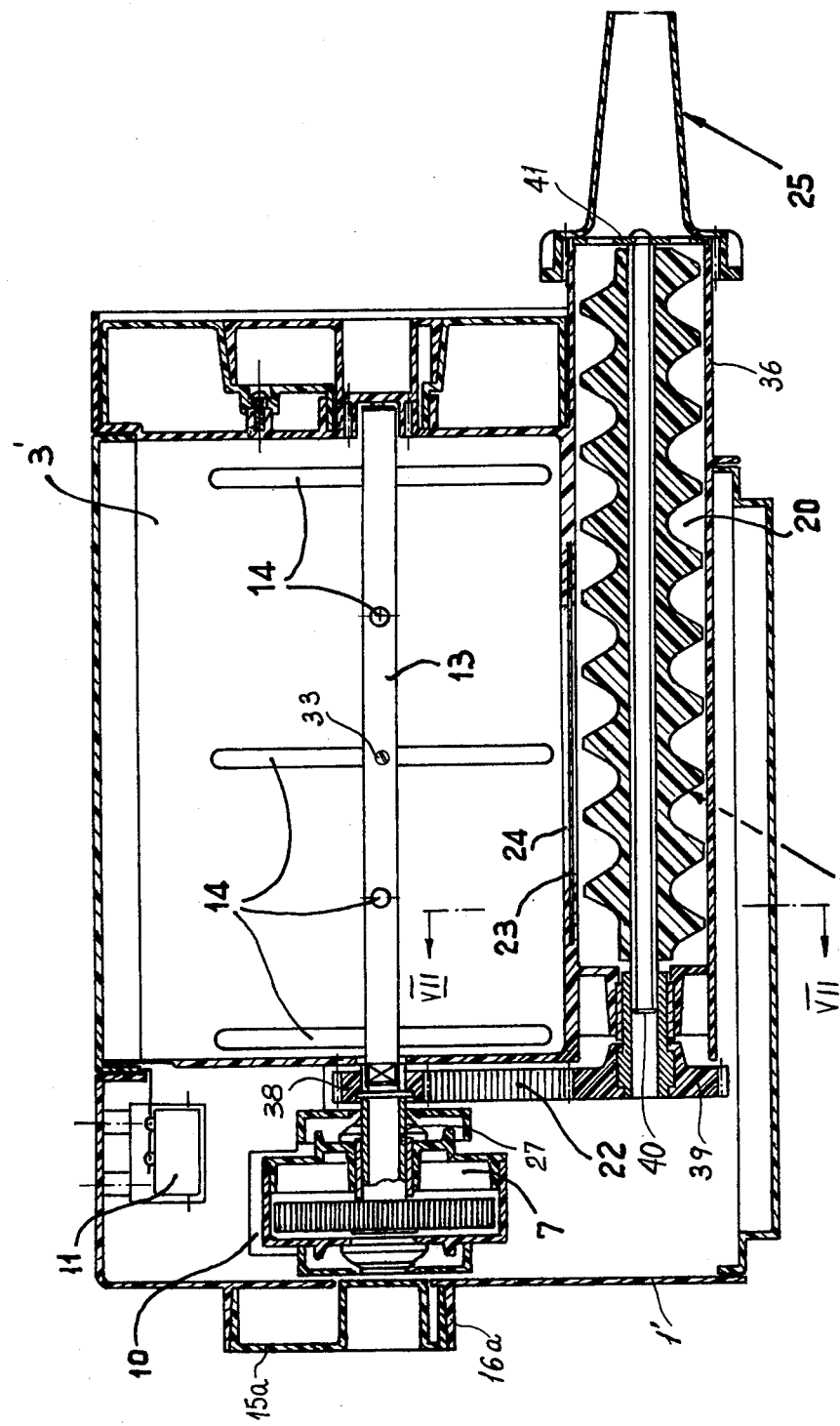

KITCHEN APPARATUS FOR PRODUCING FARINACEOUS PRODUCTS

FIELD OF THE INVENTION

My present invention relates to a houshold appliance to be used in a kitchen for making sphaghetti, noodles and other farinaceous products from alimentary pasta simply referred to hereinafter as dough.

BACKGROUND OF THE INVENTION

Machines are known for the automatic mixing of dough on an industrial scale and for thereafter shaping the dough to form the desired consumer products. This conventional equipment, however, does not readily lend itself to use in an individual household even when reduced in size and dough-handling capacity. Thus, for example, the usual type of agitator rotatably mounted in a mixing vessel tends to accumulate incrustations of dough around its shaft carrying stirring elements such as paddles or blades; in large-scale operation, these incrustations can be disregarded, whereas in a private kitchen they use up significant portions of the available flour and other ingredients. Moreover, the retarding effect of such incrustations may be an impediment to proper operation of an agitator driven by a low-power motor.

OBJECTS OF THE INVENTION

The general object of my present invention, therefore, is to provide a compact, relatively inexpensive and easily cleanable household appliance for mixing dough.

A more particular object is to provide an appliance of this type which can be conveniently fitted with one or more ancillary devices for rolling, slicing or otherwise shaping the mixed dough.

SUMMARY OF THE INVENTION

A mixing vessel forming part of an appliance according to my present invention, received in a housing, is centered on a preferably horizontal axis to accommodate the shaft of an agitator in line with that axis. A free end of the shaft is rotatably journaled in a bearing, seated in an end wall of the housing, while its opposite end is positively coupled with a drive mechanism which may include an electric motor and an associated speed reducer located in a gear box. The agitator further comprises a set of stirring elements which are detachably secured to the shaft and whose removal from the shaft enables the latter to be axially withdrawn through its bearing seat; such withdrawal also facilitates the removal of the mixing vessel from the housing for emptying and cleaning. With the vessel in position, its interior is accessible through a top opening normally closed by a cover which may be hinged to the housing.

According to a more particular feature of my invention, the stirring elements are cylindrical rods fitted into through-going transverse bores of the agitator shaft. The rods may be held in position by countersunk setscrews, for example, which can be readily loosened when the cover is opened.

Pursuant to another feature of my invention, the drive mechanism serving to rotate the agitator is also available to power an ancillary dough-shaping attachment after the mixing operation has been completed.

To facilitate cleaning and maintenance, without the use of oil or other lubricants that could contaminate the products, I prefer to construct major parts of the appliance — including its reduction gearing — of low-friction thermoplastic material, e.g. polyamide (nylon); polytetrafluoroethylene (Teflon) could also be used, particularly along contact surfaces of relatively movable members.

BRIEF DESCRIPTION OF THE DRAWING

The above and other features of my invention will now be described in detail with reference to the accompanying drawing in which:

FIG. 2 is a cross-sectional view taken on the line II — II of FIG. 1;

FIG. 3 is a lateral sectional view taken on the line III — III of FIG. 1;

FIG. 5 is a fragmentary sectional side view relating to the modification of FIG. 4;

FIG. 6 is a view similar to FIG. 3, showing additional features of the modified appliance partly illustrated in FIGS. 4 and 5;

SPECIFIC DESCRIPTION

Figure 1:
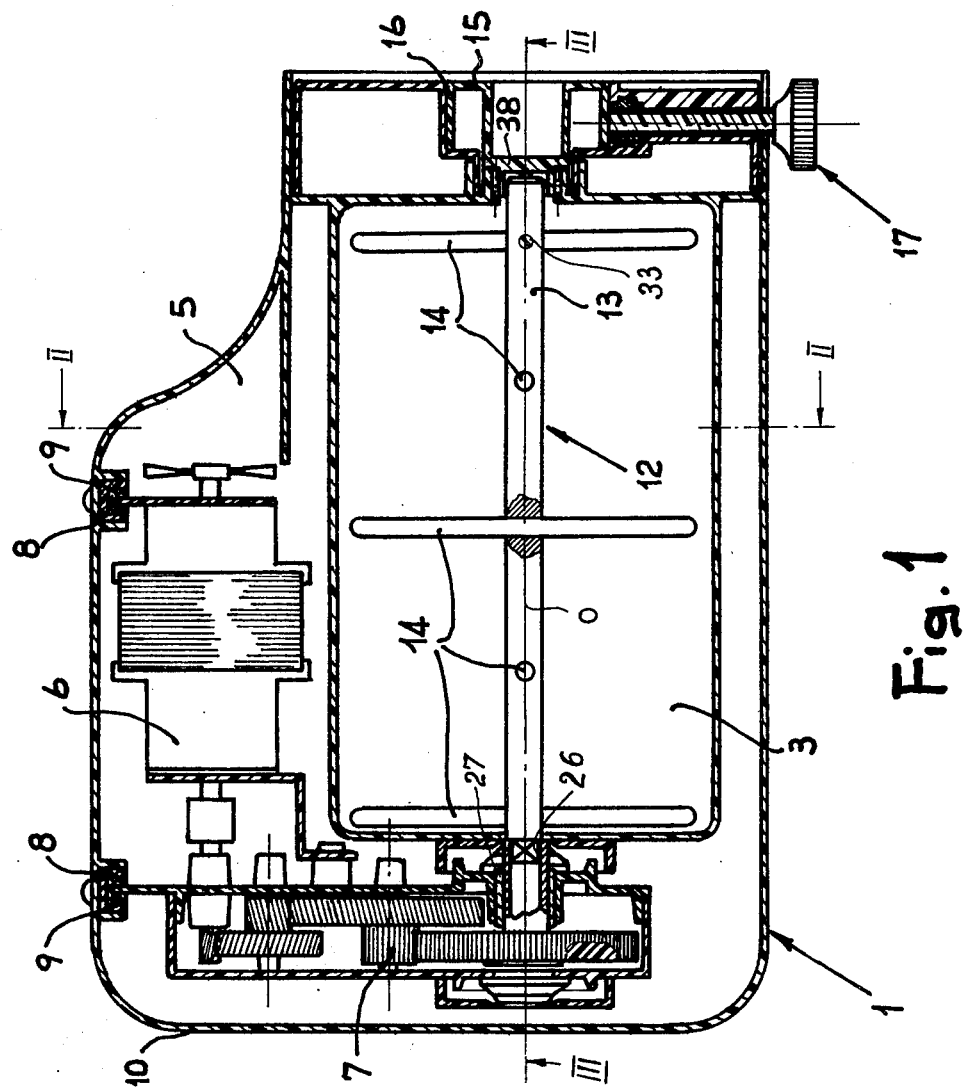
FIG. 1 is a sectional top view of a household appliance embodying my invention.

In FIGS. 1–3 I have shown a household appliance, designed for the mixing of dough, comprising a housing 1 which is deep-drawn from thermoplastic sheet material such as nylon. The housing is supported by several feet 2 (only one shown), in the form of suction cups, and accommodates in its interior 5 an upwardly open mixing vessel 3 with a semicylindrical lower portion centered on an axis 0. The top of the housing is normally closed by a cover 4 hinged to it at 34 and provided with a handgrip 35.

An electric motor 6 inside housing 1 works into a speed-reducing transmission 7 located within a gear box 10; the latter is secured to the inner housing wall with the aid of brackets 8 (only one shown) provided with pads 9 designed to absorb noise and vibrations. Vessel 3 and gear box 10 may also consist of deep-drawn thermoplastic sheet material such as nylon; the gears of speed reducer 7 advantageously consist of a like material.

The energizing circuit of motor 6 includes a safety switch 11 which is controlled by the cover 4 to deactivate the motor when that cover is opened. Advantageously, as illustrated diagrammatically in FIG. 2, the circuit also includes a timer 30 which can be manually set to stop the motor after a selected operating period.

An agitator 12 comprises a shaft 13, centered on axis O, which traverses the vessel 3 and carries an array of stirring elements 14 serving to mix a mass of dough in the vessel. The right-hand end of shaft 13, as viewed in FIGS. 1 and 3, is journaled in a simple thermoplastic bearing 28 in the shape of a cap which is fitted into a seat formed by a collar 16 on the right-hand end wall of the housing. Bearing cap 28 is backstopped by a plug 15 held in position by a setscrew 17. These members 15 and 28 absorb any minor axial stresses to which the agitator 12 may be subjected.

Figure 9:
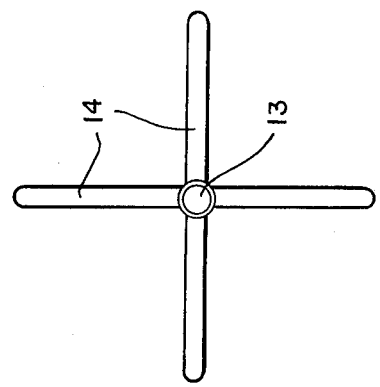
FIGS. 8 and 9 are opposite end views of an agitator forming part of the appliances of FIGS. 1–7.
Figure 8:
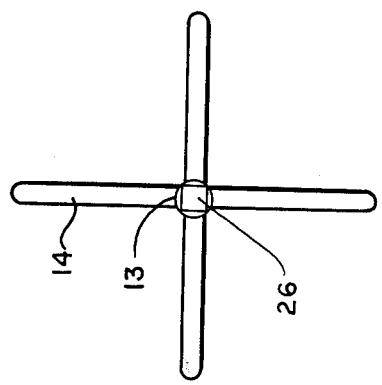

The opposite, left-hand end of shaft 13 has a prismatic head 26 (see also FIG. 8) which positively fits into a prismatically hollowed-out gear shaft 27 at the output of speed reducer 7. Stirring elements 14 are slender cylindrical rods, of a diameter approximately half that of shaft 13, which are inserted into throughgoing transverse bores of that shaft at axially equispaced locations and are held in position by setscrews 33. Adjacent rods 14 are relatively angularly offset by 90° as best seen in FIGS. 8 and 9.

The operating period set by timer 30 should be so chosen that motor 6 is cut off before any significant hardening of the dough, in order to avoid overloading.

Upon a loosening of setscrews 33, which are accessible after the cover 4 has been opened, the several dough-beating rods 14 can be extracted. Thereafter, with setscrew 17 loosened and plug 15 removed, shaft 13 can be withdrawn through bearing seat 16 to facilitate the removal of vessel 3. The contents of that vessel can now be subjected to further treatment, e.g. by an attachment 18 or 18a as shown in FIGS. 3 and 5. Attachment 18, retainable in collar 16 by setscrew 17, comprises a pair of counterrotating rollers 31, 32 which can be driven from speed reducer 7 through an auxiliary shaft 19 whose left-hand end has the same shape as that of shaft 13 and whose right-hand end is of hollow prismatic shape to fit over a complementary extremity 29 of the shaft of roller 31. Thus, upon reclosure of cover 4, motor 6 may be restarted to drive the rollers 31, 32 between which the dough extracted from vessel 3 and manually fed to these rollers can be flattened into a sheet as is well known per se.

In an analogous manner, counterrotating rollers 31a and 32a of attachment 18a may be driven from motor 6. Roller 31a has a shaft extremity 29a positively engageable by an extension of output shaft 27 of speed reducer 7. Attachment 18a serves to slice the dough, as likewise known per se, into noodles or stracciatelli.

Figure 4:
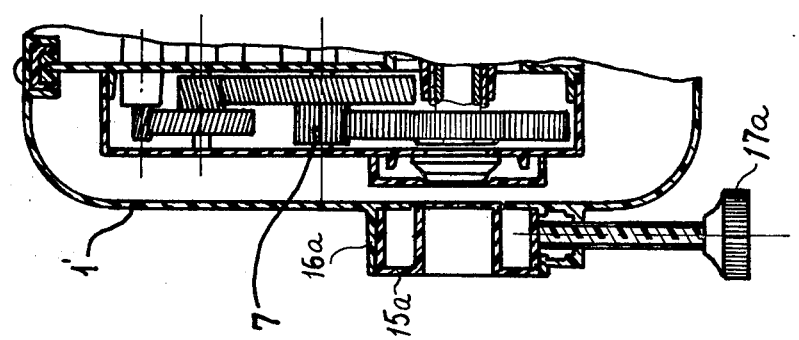
FIG. 4 is a fragmentary sectional top view showing a modification of the left-hand end of the appliance ilustrated in FIG. 1.

The appliance shown in FIGS. 4–6 is similar to that of FIGS. 1–3 but has a modified housing 1' whose left-hand end wall is formed with an opening for the passage of shaft extremity 29a. A collar 16a on that end wall supports the attachment 18a, with the aid of a setscrew 17a, in a manner similar to the way in which bearing seat 16 on the right supports the attachment 18. When the attachment is removed, the housing wall is sealed by a plug 15a as illustrated in FIG. 4.

Figure 7:
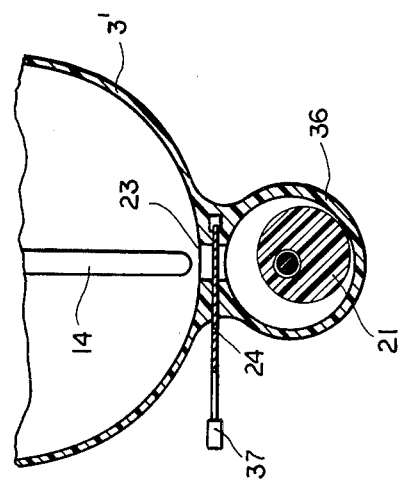
FIG. 7 is a fragmentary cross-sectional view taken on the line VII — VII of FIG. 6.

As shown in FIGS. 6 and 7, housing 1' accommodates a modified mixing vessel 3' having a downward extension 36 which forms a cylindrical chamber 20 accommodating an extrusion screw 21 for the discharge of the dough through a nozzle 25. Chamber 20 is separated from the interior of vessel 3' by a shutter 24 normally obstructing a slot 23 on the bottom of the vessel. After the mixing operation, lateral withdrawal of the shutter by a handle 37 (which is accessible from the outside of housing 1') unblocks the slot 23 whereupon operation of motor 6 drives the extrusion screw 21 via a chain 22 linking a sprocket 38 on gear shaft 27 with another sprocket 39 on the extruder shaft 40. The extruded dough reaches the nozzle 25 through a diaphragm 41 so as to assume the tubular shape of macaroni.

Although FIG. 3 shows the mixing vessel 3 lodged in housing 1, the presence of that vessel is not essential when the attachment 18 is driven via auxiliary transmission shaft 19. Obviously, vessel 3 can also be absent during operation of attachment 18a. The positive connection between speed-reducer shaft 27 and any shaft driven by it may include a bayonet coupling.

I claim:

1. A household appliance for producing farinaceous products, comprising:
    a housing having an end wall provided with a seat aperture;
    a mixing vessel in said housing centered on an axis in line with said seat;
    bearing means in said seat aperture centered on said axis;
    agitating means in said vessel for beating a mass of dough, said agitating means including a shaft in line with said axis and a set of stirring elements detachably secured to said shaft, a free end of said shaft being rotatably journaled in said bearing means;
    drive means in said housing positively coupled with an opposite end of said shaft, the latter being disengageable from said drive means and axially withdrawable from said housing through said seat aperture upon detachment of said stirring elements; and
    removable cover means on said housing giving access to the interior of said vessel.

2. An appliance as defined in claim 1 wherein said stirring elements are cylindrical rods fitted into through-going transverse bores of said shaft.

3. An appliance as defined in claim 1 wherein said vessel is generally semicylindrical, said axis being horizontal.

4. An appliance as defined in claim 3, further comprising ancillary dough-shaping means secured to said housing for actuation by said drive means.

5. An appliance as defined in claim 4 wherein said dough-shaping means comprises an extruder underneath said vessel, the latter having a bottom slot provided with closure means removable to let dough pass from said vessel to said extruder.

6. An appliance as defined in claim 1 wherein said drive means comprises a motor and a speed reducer coupled with said motor, said speed reducer normally engaging said opposite end.

7. An appliance as defined in claim 6 wherein said housing, said vessel and said speed reducer consist of thermoplastic material.

8. An appliance as defined in claim 6 wherein said motor has an energizing circuit including switch means openable by said cover means upon removal thereof to deactivate said drive means.

9. An appliance as defined in claim 1, further comprising timing means for automatically deactivating said drive means after a predetermined operating period.

10. An appliance as defined in claim 1, further comprising an ancillary dough-shaping attachment receivable in said seat upon removal of said bearing means, and transmission means emplaceable in said housing for operatively linking said attachment with said drive means.

* * * * *